W. D. WEBSTER.
Hand-Hoe.
No. 198,910. Patented Jan. 1, 1878.
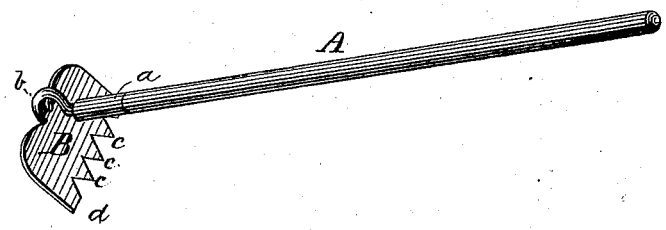
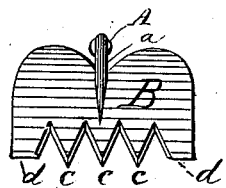

UNITED STATES PATENT OFFICE.

WILLIAM D. WEBSTER, OF ST. CATHARINES, ONTARIO, CANADA.

IMPROVEMENT IN HAND-HOES.

Specification forming part of Letters Patent No. 198,910, dated January 1, 1878; application filed September 24, 1877.

*To all whom it may concern:*

Be it known that I, WILLIAM D. WEBSTER, of St. Catharines, in the Province of Ontario and Dominion of Canada, have invented certain new and useful Improvements in Hand-Hoes; and I do hereby declare that the following is a full, clear, and exact description thereof, which will enable others skilled in the art to which they appertain to make and use the same, reference being had to the accompanying drawings, which form a part of this specification, and in which—

Figure 1 is a perspective view of my improved serrated hoe secured upon its handle and ready for use, and Fig. 2 is a front or face view of the blade of the hoe.

Similar letters of reference indicate corresponding parts in both the figures.

My invention relates to hand-hoes for general purposes; and consists in constructing the blade with a series of sharp or pointed teeth, arranged in a row between two shorter edge teeth having flat or blunted points, substantially as hereinafter more fully described, and pointed out in the claim.

In the drawings, A is the handle; $a$, the socket for securing the blade to the handle. $b$ is the shank, and B the blade. The latter is made, preferably, from bar-steel, hammered, and provided with a series of pointed teeth, $c$, by punching, cutting, or in any other suitable manner.

By reference to the drawing it will be seen that the end or edge teeth (denoted by $d\ d$) do not terminate in points, like the intermediate teeth $c$, but in flat or straight edges.

It will also be seen that the said edge teeth are somewhat shorter than the pointed intermediate ones.

The object of this is to enable the hoe to be used close in under growing plants without injury to the roots, because the flat tooth which is nearest to the plant will not penetrate the soil a sufficient distance to cause injury to the root by tearing its filaments in operating the hoe; yet the intermediate teeth, which are a greater distance from the stem, will cut sufficiently deep to tear up weeds and turn and pulverize the soil.

The ready entrance of the teeth into the soil is effected by placing the blade at a suitable angle in relation to the handle, so that in drawing the hoe toward the operator the teeth will be forced slantingly into the ground.

This hoe is adapted both for garden and field purposes, and may be used to hoe around the most tender plants or bulbs without injury.

I claim and desire to secure by Letters Patent of the United States—

As an improvement in hand-hoes, the blade B, having a series of pointed teeth, $c$, arranged between two edge teeth, $d\ d$, with flat points or edges, the said edge teeth being shorter than the intermediate pointed ones, substantially as and for the purpose hereinbefore set forth.

In testimony that I claim the foregoing as my own I have hereto affixed my signature in presence of two witnesses.

WILLIAM DAVID WEBSTER.

Witnesses:
HORACE SELLECK,
WILLIAM H. DAY.